United States Patent [19]

Miller et al.

[11] Patent Number: 5,550,968
[45] Date of Patent: Aug. 27, 1996

[54] METHOD AND SYSTEM FOR PROVIDING ACCESS SECURITY TO CONTROLS IN A GRAPHICAL USER INTERFACE

[75] Inventors: Steven M. Miller, Apex; Richard J. Redpath, Cary, both of N.C.

[73] Assignee: International Business Machines Corporation, Armonk, N.Y.

[21] Appl. No.: 226,529

[22] Filed: Apr. 12, 1994

[51] Int. Cl.$^6$ ........................................ G06F 3/14
[52] U.S. Cl. ........................................ 395/157; 395/155
[58] Field of Search ........................................ 395/153, 154, 395/155, 156, 157, 158, 159, 160, 161, 187.01; 380/55; 370/85.6

[56] References Cited

U.S. PATENT DOCUMENTS

| | | | |
|---|---|---|---|
| 5,032,979 | 7/1991 | Hecht et al. | 395/187.01 |
| 5,077,795 | 12/1991 | Rourke et al. | 380/55 |
| 5,317,568 | 5/1994 | Bixby et al. | 370/85.6 |
| 5,388,196 | 2/1995 | Pajak et al. | 395/153 |

*Primary Examiner*—Mark R. Powell
*Assistant Examiner*—Ruay Lian Ho
*Attorney, Agent, or Firm*—Gregory M. Doudnikoff

[57] ABSTRACT

A system and method for providing restricted access to controls of a graphical user interface. An object-oriented subclass is selectively applied to individual controls, so that upon creation or opening of a window having any such controls, a region of obscuration is defined which shields control information from view. Access may then be obtained by entry of an authorized password. Alternatively, a determination may be made during the creation or opening of a window as to whether the user or terminal is authorized, and if not, a region of obscuration is defined and displayed over the control information. Different levels of access to the control information may also be provided, such as view only and view and manipulate.

33 Claims, 7 Drawing Sheets

METHOD AND SYSTEM FOR PROVIDING ACCESS SECURITY TO CONTROLS IN A GRAPHICAL USER INTERFACE

BACKGROUND OF THE INVENTION

1. Field of the Invention

The present invention relates to a method and system for providing security to controls in a graphical user interface through a single, uniform, and intuitive interface for users of all levels of access privilege. More particularly, the present invention relates to a method and system by which access to information contained in a window is restricted or limited without requiring the design of different versions of the window or more complicated interfaces.

2. Description of the Related Art

Data processing and database access systems commonly utilize graphical user interfaces to allow users to interact with the system and manipulate the activities and functions available to the users. Users may select a particular activity of the system available through the graphical user interface (GUI) via various input devices, such as a keyboard or mouse, and a combination of GUI elements, such as menu bars, pull-down menus, pop-up menus, icons, and objects. Another standard user-operable element of GUI is known as a "control". A control is a visual element within a GUI which may be manipulated by a user to interact with data. Icons and objects are examples of controls. Virtually any kind of data can be presented to a user via a control. For example, the personnel department of a business may maintain employee records, including name, salary information, birthdate, social security number, etc., in a database which is accessible through a control of a GUI. In this case, the control provides the business with quick and easy means to view, update and/or edit those records. In software applications utilized by companies that take orders for products by telephone, a variety of customer information can be input and later viewed through controls, including such sensitive information as credit card numbers.

Clearly, not all users of data processing systems will have the need to access all information available through a control or group of controls of a GUI. Some information will be privileged, and it would be preferable to restrict access to certain users. The manager of the hypothetical personnel department may require personal access to each employee's salary or home telephone number, but may wish that other members of the personnel department be kept from viewing this information. Employees filling orders taken by telephone will need the name and address of the customer and the list of items ordered, but not the customer's credit card information.

One current technique employed for providing security for data input to a control is to prevent the display of the data being input. This technique is routinely used for passwords. This type of control is known as an input control. When the display of existing information of a database is desired, access privilege is currently provided via redesigning the entire panel or screen displayed to the user. This type of output control is expensive to create, since it requires significant additional work by a programmer, often leads to a more complicated user interface, and is memory intensive. In general, these approaches prevent access and design uniformity, greatly increase development and maintenance costs, make the system harder to use, and require that more time and money be spent on user education.

Therefore, a need exists for a method and system of providing security to a control while allowing uniformity of design, without the introduction of extraneous controls, such as pushbuttons, and the resulting loss of limited GUI screen space.

SUMMARY OF THE INVENTION

Accordingly, an object of the present invention is to provide a method and system of providing security for individual controls within a window of a GUI.

Another object of the present invention is to provide security for certain elements of a GUI without requiring different windows to be created for each level of access privilege.

Still another object of the present invention is to provide a system and method for providing security to controls which is applicable to existing and future controls and which does not require the creation of new controls.

Yet another object of the subject invention is to provide security for controls while requiring a minimal number of transaction requests.

Another object of the invention is to provide security for controls while using relatively small amounts of computer memory.

Still another object of the invention is to provide security for controls while maintaining a uniform GUI for all levels of users.

To achieve the foregoing objects and in accordance with the purpose of the invention as broadly described herein, a method is provided for limiting access to information in predetermined controls of windows in a graphical user interface, comprising the steps of, during creation of a window which includes a predetermined control, sizing an opening for the predetermined control and defining an area for the predetermined control within the window; sizing an obscuring member and defining an area for the obscuring member within the window so that the information in the predetermined control will be obscured from view when the window is displayed; and displaying the window with the information in the predetermined control obscured from view by the obscuring member. The method may further comprise the step of, during creation of the window, sizing a secure control access button and defining an area for the button within the window, wherein the displaying step further comprises displaying the secure control access button.

The method may further comprise the steps of, upon selection of the secure control access button by a user, sizing a password control and defining an area for the password control within the window; displaying the password control; upon entry of a password by the user, determining whether the password is authorized; if the entered password is authorized, deleting the obscuration and providing a password dependent level of access to the information of the predetermined control; and if the password is not authorized, denying access to the information of the predetermined control. Additionally, the user session may be terminated if the user unsuccessfully attempts to enter a password more than a predetermined number of times. An additional step may comprise re-obscuring the information of the predetermined control if the information has been visible for more than a predetermined amount of time. Furthermore, the level of access to the information may be view only if the password is a view-only level password and view and manipulate only if the password is a view and manipulate level password. Still further, the obscuring member may be a slide panel which fits over the area of the predetermined control, or the obscuring member may have characteristics such that the existence of the predetermined control is not determinable by viewing the window.

In addition, in a computing environment including a processor, memory and a display, a system is provided for limiting access to selected controls of a window of a software application, comprising means for obscuring information of a selected control of a window normally presented to a user via the display upon creation of the window; means for recognizing a request from the user to access the obscured information of the selected control; and means for determining whether the user is authorized to access the obscured information and permitting access if the user is authorized. The determining means may further comprise means for requesting entry of a password, means for receiving an entered password, and means for determining whether the entered password is valid for gaining access to the obscured information. The determining means may provide different levels of access to the obscured information depending on an authorization level of the user. The system may further comprise means for closing the application upon the user unsuccessfully requesting access to the obscured information a predetermined number of attempts and means for re-obscuring the information in the selected control after the information has been accessible for a predetermined amount of time.

The present invention also provides a method for restricting access to information in predetermined controls of windows in a graphical user interface, comprising the steps of, during creation of a window having a predetermined control, determining whether a user requesting creation of the window is authorized to access the control; if the requesting user is authorized, sizing and defining the predetermined control within the window and displaying the predetermined control within the window so that the information in the predetermined control is accessible; and if the requesting user is not authorized, sizing and defining the predetermined control within the window, sizing and defining a region of obscuration coincidental with at least the information in the predetermined control, and displaying the predetermined control within the window so that the information is obscured from view by the region of obscuration. The method may also provide the step of, after the elapse of a predetermined period of time following the displaying of the predetermined control with the information accessible, sizing and defining a region of obscuration coincidental with at least the information in the predetermined control and displaying the region of obscuration over the information. The determining step may further comprise checking a user identification of the user with an authorization repository to determine an authorization level of the user. The determining step may further comprise determining a level of access permitted for a workstation for which the window is being created by checking on identification for the workstation with an authorization repository.

If the user is not authorized, the method may further comprise the steps of sizing and defining in the window and displaying a control access request button; upon selection of the secure control access button by a user, sizing a password control and defining an area for the password control within the window; displaying the password control; upon entry of a password by the user, determining whether the password is authorized; if the entered password is authorized, deleting the obscuration and providing a password dependent level of access to the information of the predetermined control; and if the password is not authorized, denying access to the information of the predetermined control. The method may further terminate the user session if the user unsuccessfully attempts to enter a password more than a predetermined number of times.

Alternatively, the present invention provides a system in a computing environment for selectively permitting access by users to limited access controls included in windows of a software program, comprising means for determining whether a user is authorized to access limited access control of a window during creation of the window; means for denying access to the limited access control if said determining means determines that the user is not authorized; and means for providing an authorized level of access to the limited access control if the determining means determines that the user is authorized. The authorized levels of access may include view only access to information in the limited access control and view and manipulate access to information in the limited access control. Further, the access denying means may comprise an obscuring member positioned coincidentally within the window to at least information included in the limited access control. Further, the obscuring member may be a slide panel which covers the limited access control, or the obscuring member may cover the limited access control so that whether the limited access control exists cannot be determined by viewing the window.

The system may further comprise means for recognizing a request from the user to access the limited access control to which the denying means initially denied access. Additionally, the system may further comprises means for ending access to the authorized user after access to the limited access control has been provided for a limited access period of time. Further, the determining means may establish an identity of a workstation being utilized by the user and compare the identity with an access authorization list to determine whether the user is authorized to access the limited access control.

The present invention also provides an object class for providing limited user interaction to controls defined in a graphical user interface to which said object class is applied, comprising means for defining and sizing a limited access region within the graphical user interface coincidental to at least information included in a control to which said object class has been applied during creation of the control for display purposes, means for limiting user interaction to the information in the control within the limited access region, and means for processing requests to interact with the information in the limited access region.

The processing means may further comprise means for sizing and defining a password access request control within the graphical user interface and causing the password access request control to be displayed, means for determining a level of access to the information to which an input password corresponds, and means for providing the user with the determined level of access to the information. Additionally, the limited access region may be a region of obscuration which shields the information from view and prevents user manipulation of the information. The levels of access may include no access, view only, and view and manipulate.

Further, the present invention provides an object class for providing limited user interaction to controls defined in a graphical user interface to which said object class is applied, comprising means for discovering a level of access to a control to which said object class has been applied to which a user is authorized upon a user requesting creation of a window including the control, and means for limiting user interaction to the information in the control in accordance with the level of access. The object class may further comprise means for processing requests to interact with the information in the control.

These and other features, aspects, and advantages of the present invention will become better understood with reference to the following description, appended claims, and accompanying drawings in which like reference numbers denote the same element.

DESCRIPTION OF THE PREFERRED EMBODIMENT

Figure 1:
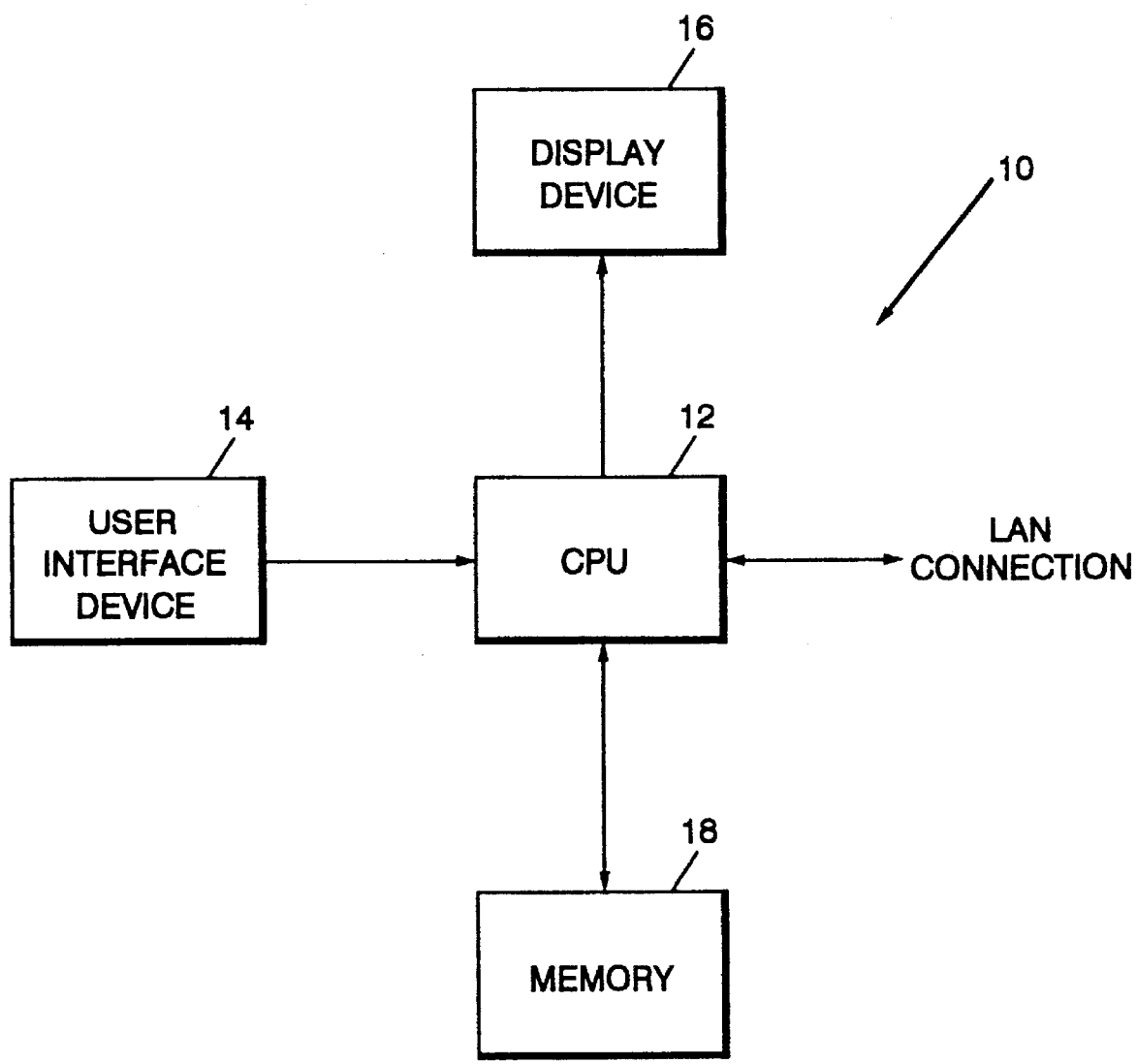
FIG. 1 is a block diagram of a workstation environment which may be utilized by a user of an application including the present invention.

An embodiment of the present invention will now be described with initial reference to FIGS. 1 and 2, which illustrate a representative hardware environment in which the present invention may be practiced. FIG. 1 illustrates the configuration of a typical user station 10, which may be a workstation or personal computer or user station associated with a host computer system. The user station 10 includes a central processing unit (CPU) 12, which may be a microprocessor of a workstation or personal computer or the like. In any case, known means are employed to connect and enable communication between the CPU 12 and the components of a user station. The user station will typically include one or more user interface devices 14, such as a keyboard, a mouse, a touch sensitive screen, a digitized pen entry pad, etc. The CPU 12 is also connected to a display device 16, such as an LCD screen or CRT, and to memory 26, which can include ROM, RAM, DASD, etc.

Although the user station 10 is shown being connected to a local area network (LAN), a preferred embodiment of the present invention may be implemented in other types of data processing systems, such as for example, intelligent workstations, mini-computers, client/server system, or a local area network. For example, the present invention may be implemented in a client/server system or a local area network to provide security for information shared via the client/server system or local area network, but resident in different computers. Further, the present invention may be implemented on an independent workstation having no connection or communication with other computers or computer systems.

Figure 2:
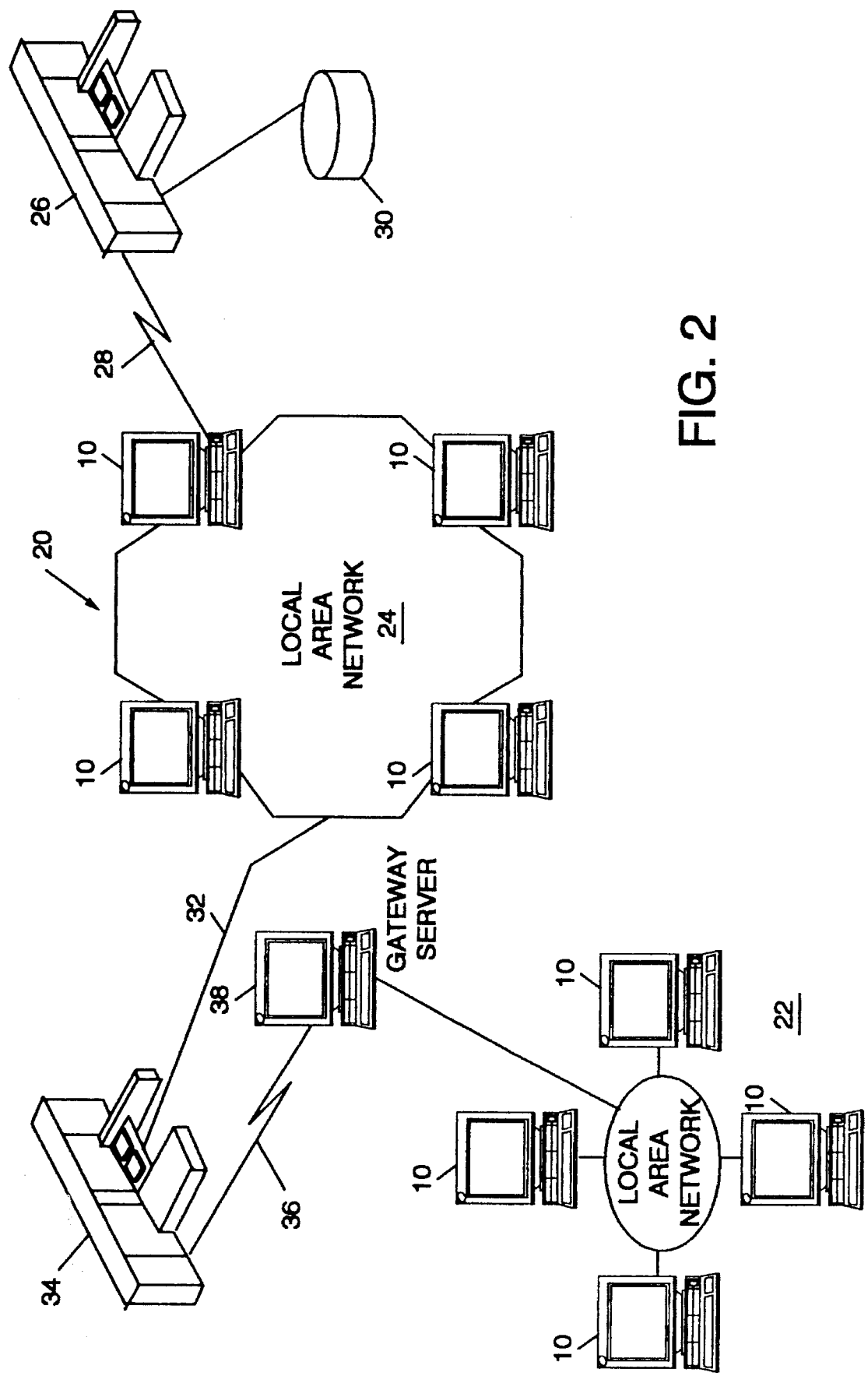
FIG. 2 is a diagram of a computing environment in which the present invention may be practiced.

For example, with reference to FIG. 2, a data processing system 20, which may be utilized to implement a method and system of the present invention, is illustrated. The data processing system 20 includes a plurality of networks, including LANs 22, 24, each of which preferably includes a plurality of individual user stations 10. If course, those skilled in the art will appreciate that a plurality of intelligent workstations (IWS) coupled to a host processor may be utilized for each such network.

Still referring to FIG. 2, it may be seen that the data processing system 20 also may include multiple mainframe computers, such as a mainframe computer 26, which may be preferably couple to the LAN 24 by means of communications link 28. The mainframe computer 26 may be implemented utilizing an Enterprise System Architecture/370 (also called an "ESA/370") or an Enterprise Systems Architecture/390 (also called an "ESA/390") computer available from the International Business Machines Corporation (IBM). Depending on the application, a mid-range computer, such as an Application System/400 (also called an "AS/400"), may be employed. "Enterprise Systems Architecture/370", "ESA/370", "Enterprise Systems Architecture/390"and "ESA/390"are trademarks of IBM; "Application System/400"and "AS/400"are registered trademarks of IBM. The mainframe computer 26 also may be coupled to a storage device 30 which may serve as remote storage for the LAN 24. Similarly, the LAN 24 may be coupled via communications link 32 through a subsystem control unit/ communications controller 34 and communications link 36 to a gateway server 38. The gateway server 38 is preferably an individual computer or IWS which serves to link the LAN 22 to the LAN 24.

Of course, those skilled in the art will appreciate that the mainframe computer 26 may be located a great geographic distance from the LAN 24, and similarly, the LAN 24 may be located a substantial distance from LAN 22. For example, the LAN 22 may be located in California, while the LAN 24 may be located in Texas, and the mainframe computer 26 may be located in New York. As those skilled in the art are well aware, a graphical user interface environment for a data processing system is implemented with computer readable code, also known as software, which is executed on appropriate hardware. Flowcharts 5 and 7 describe the logical steps carried out by software in which the present invention is embodied for execution on hardware. Software program code of this nature is typically stored in the memory of a workstation, server, or mainframe computer, as appropriate. The software program code may be embodied on any of a variety of known media for use with a data processing system, such as a diskette or CD-ROM. The code may be distributed in such media, or may be distributed to users from the memory of one computer system over a network of some type to other computer system for use by users of such other systems. Such techniques and methods for embodying the software code on media and/or distributing the software code are well known, and will not be further discussed herein.

Figure 3:
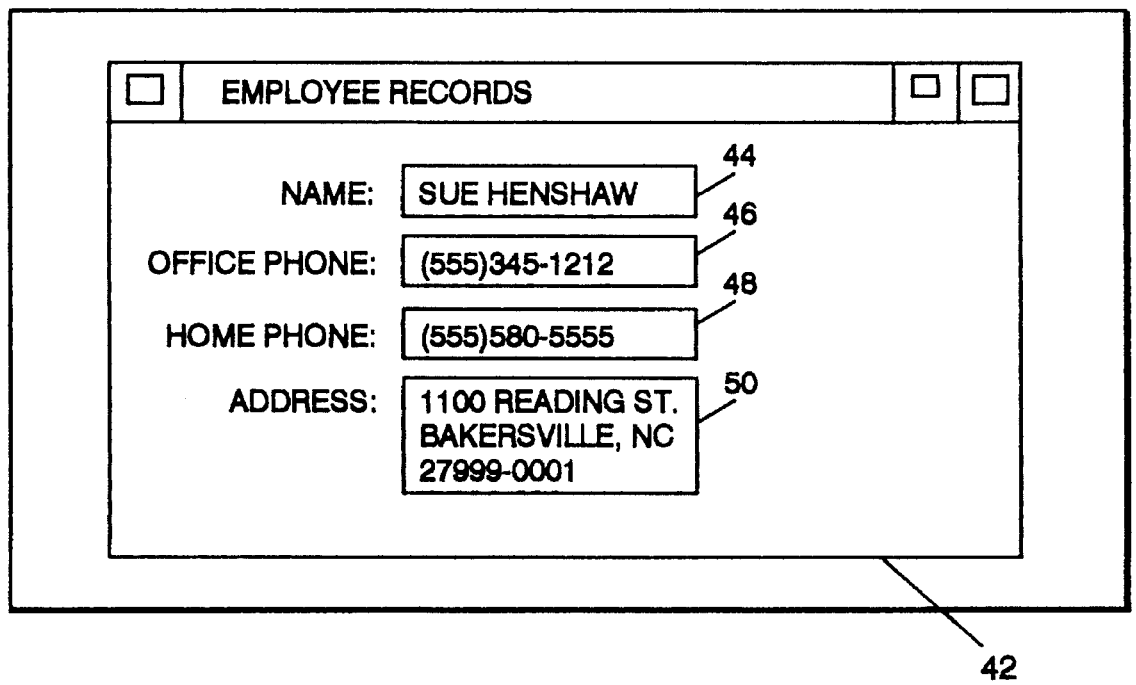
FIG. 3 illustrates a GUI having a window for a personnel database in which no controls are obscured.

FIG. 3 illustrates a graphical user interface (GUI) 40 which is of the type commonly used in software applications and which may be displayed on the display device 16 of the user station 10. The GUI 40 includes a window or panel 42 which provides access to a database or software application which maintains employee records. The panel 42 is utilized to permit employees to access and/or update certain categories of employee information via some of the controls presented in the panel 42. The panel 42 includes a control 44 for the name of an employee, a control 46 for the office phone number of the employee, a control 48 for the home phone number of the employee, and a control 50 for the home address of the employee.

The database which utilizes the employee records window 42 can be utilized both as a repository for company personnel records and as a company directory by which any employee of the company could find the office phone number of any other employee. Obviously, it would be preferred that only certain employees of the company could access and update information in the control 48, which includes an employee's home phone number, and the control 50, which includes an employee's home address. Similarly, of those employees authorized to access the information within the controls 48, 50, it might be desirable that certain employees would only have the ability to view the information contained therein, while others would be authorized to view and modify the information within the controls 48, 50 (thus modifying the underlying database). Accordingly, the present invention provides a technique by which the same window 42 can be employed for use by all employees in the company, but by which levels of access to certain controls can be controlled without requiring the creation of entirely new windows for each level of access.

The preferred embodiment of the present invention will be described with reference to object oriented programming technology. In object oriented programming, each element of a program is represented by an individual class or method. A portion of a software program which generates a window in a GUI will typically comprise a large number of reusable classes arranged together in a certain hierarchy so that certain classes are subclasses of others, and characteristics of classes are inherited by other classes. The class for creating a control in a window will necessarily include a number of attributes which, among other things, define the location and size of the control within the window, enable user initiated changes to the control to be captured by the underlying database, display the underlying information in the database, etc.

The present invention provides a subclass which can be applied to the class which defines the generation of any control in any window of a GUI and modify the attributes of the class (and therefore the control) without requiring the generation of a new window. In other words, by manipulating a single class for any or all controls within the window generation hierarchy, an entire series of different windows can be created and tailored for the appropriate user, without requiring that a programmer create a different window or panel for every type of user. This also reduces memory requirements, since multiple window generating hierarchies need not be stored for what is substantially the same window.

The present invention accomplishes the above by providing a security control subclass which includes attributes which modify the attributes of a typical control class onto which the subclass is superimposed. The typical control class includes a view operation. During the creation of a window, a control class sizes the necessary control opening in the window for the given control and defines the area of the window in which the control will be visible to the user. The security control subclass modifies this attribute by causing the control within the window (or at least the information therein) to be obscured, and/or the information contained therein not manipulatable, unless certain criteria are met. Some examples of this criteria will be explained below with reference to the flow charts of FIGS. 5A–5B and 7A–7B. The advantage of an object oriented implementation is that the security control method will typically be a pre-written, reusable module of code, which can be superimposed on a control class during the writing of a program when needed, and modified prior to being superimposed to meet the required security objectives prior to being superimposed.

Figure 4:
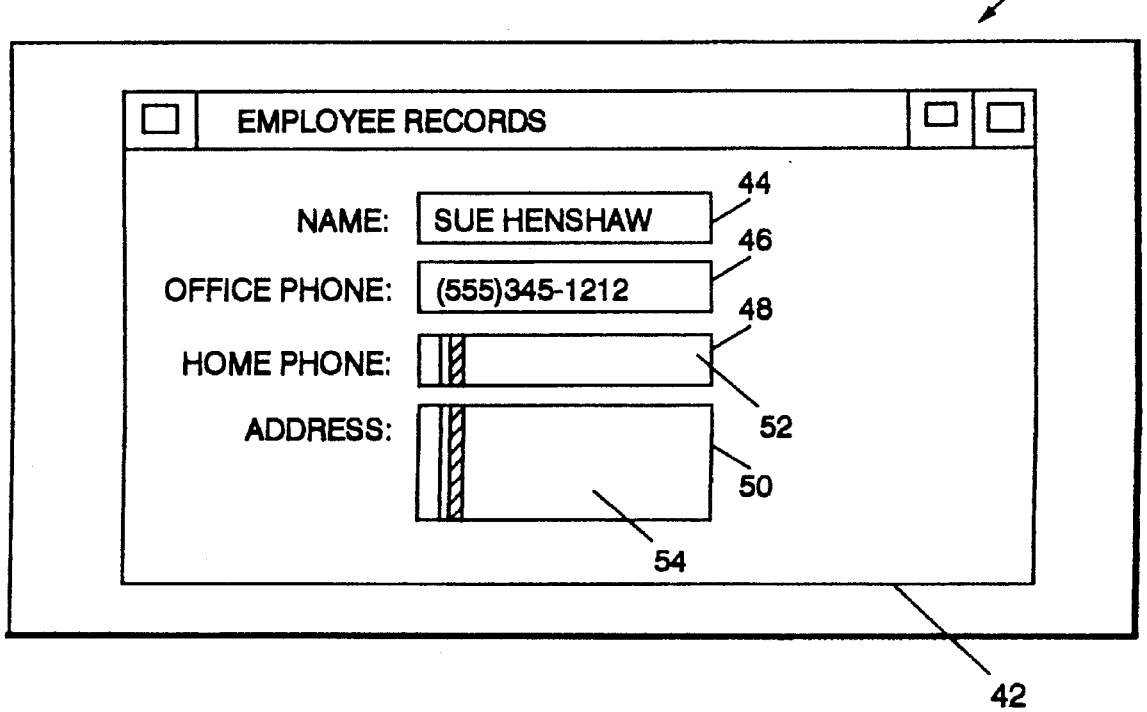
FIG. 4 illustrates the GUI of FIG. 3 in which two controls of the personnel database window have been obscured by slide panels in accordance with the present invention.

FIG. 4 illustrates the situation where the information within the employee home phone control 48 and the employee home address control 50 have been obscured in accordance with the present invention. The criteria for the controls being shown not having been met, the security control subclass causes the text to be obscured.

Figure 5A:
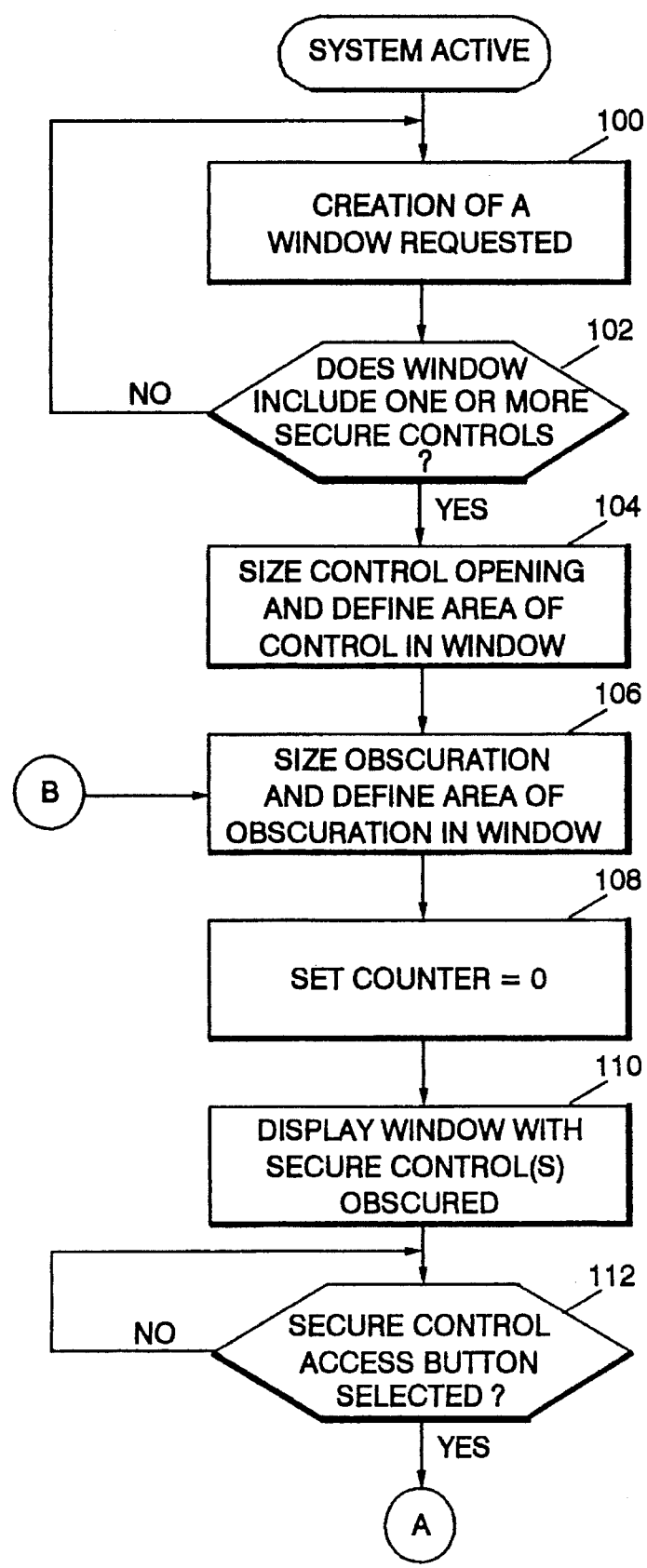
FIGS. 5A–5B illustrates a flow chart which sets forth the logic involved in opening a window having controls secured by password access in accordance with the present invention.
Figure 5B:
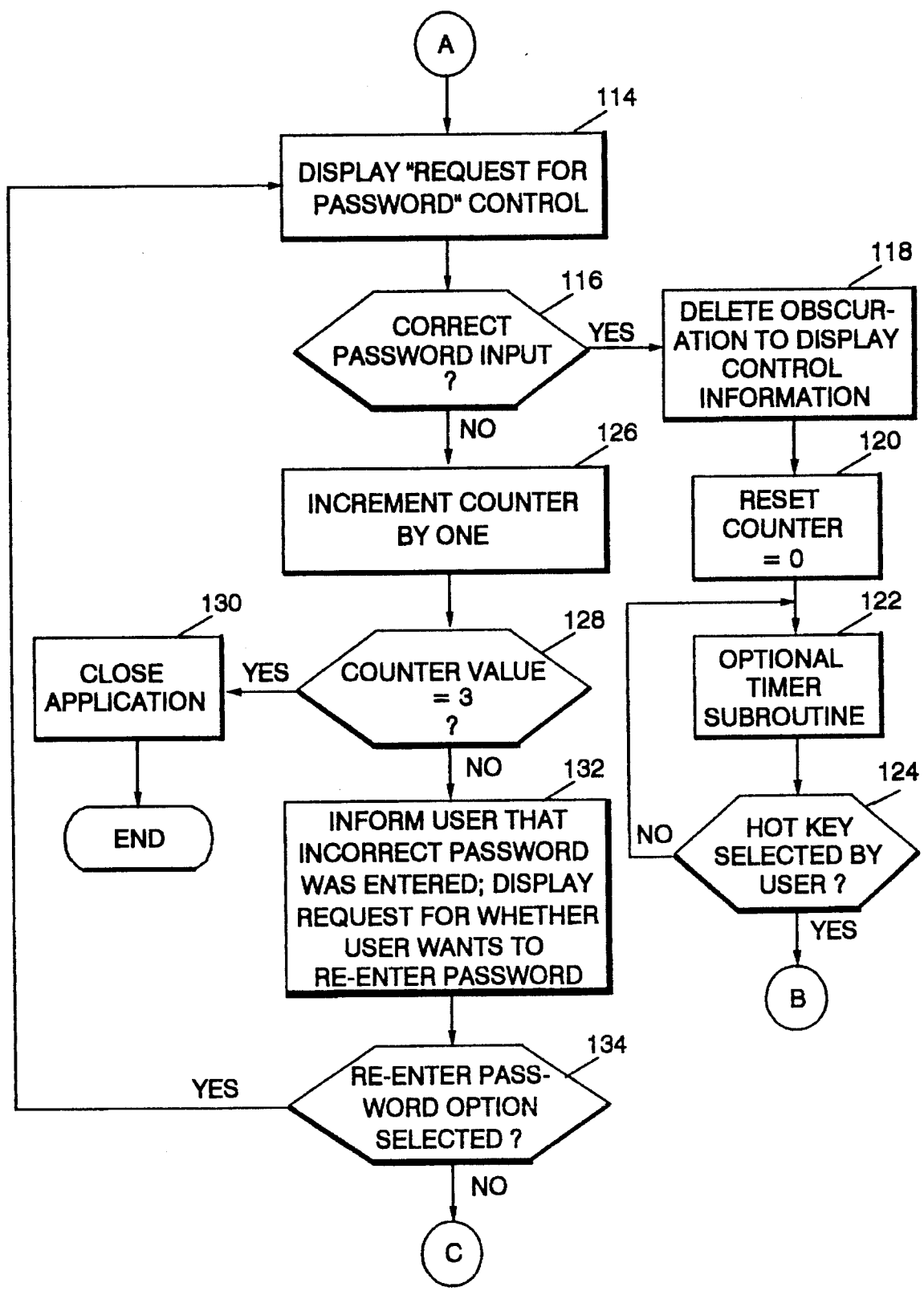

The logic of a control class having a security control subclass for obscuring data within a control from unauthorized viewers will now be discussed with reference to the flow chart of FIGS. 5A and 5B. When a computer system employing programs implementing the present invention is active, a user can manipulate the graphical user interface 40 visible on the display device 16 to request that any window from any software application accessible through the GUI 40 be created by the system and displayed (Step 100). If it is determined in Step 102 that the user has requested that a window be created which includes no secure controls, the window is created without security in accordance with known techniques. The process then awaits the next request to create a window. If it is determined in Step 102 that the user has requested that a window which includes secure controls be created, the window itself is created and the control sized and defined within the window in accordance with techniques well known and routinely employed in the art (Step 104). However, before the window and control are displayed, the security subclass causes a region of obscuration to be sized and its area defined within the window (Step 106). The region of obscuration can take any size, shape or color, but should cover the corresponding control or the information usually displayed therein, so that the information is not perceivable to the user. In the preferred embodiment, the obscuration takes the form of a slide panel. In Step 108, a counter is set to zero, and then in Step 110, the window is displayed on the display. The control information is actually present, but the security control subclass causes the obscuration to be displayed over the control information and does not permit a user to interact with, or otherwise manipulate, the obscured data. Such a window is the window 42 of FIG. 4, in which slide panels 52, 54 cover the controls 48, 50, respectively. The creation of slide panels over a control is a technique well known to those skilled in the art.

Figure 6:
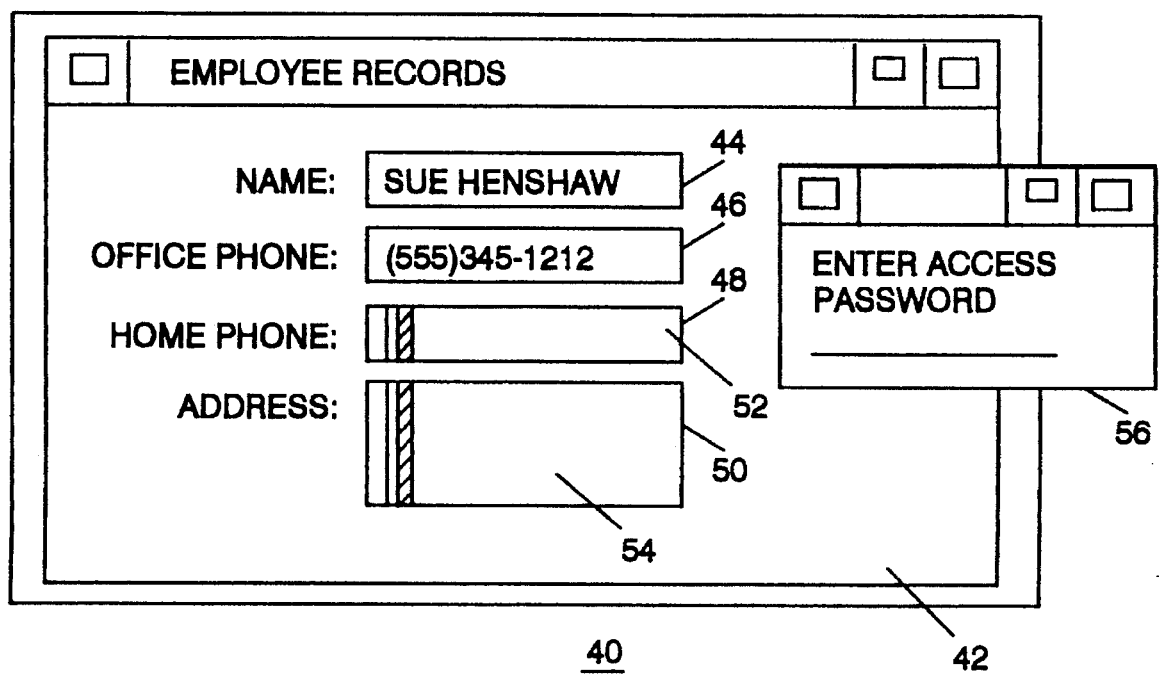
FIG. 6 illustrates the GUI of FIG. 4 after the user has selected a password access button, causing the appearance of a password access window requesting input of an access password.

The technique by which an authorized user may gain access to the information in the obscured control regions of the window 42 will now be described with reference to FIG. 6. A button may be provided within the window adjacent to or over the obscured control, or the slide panel region itself may be designed so that clicking on, or otherwise selecting, the button or slide panel region will cause creation of another control or a window 56 within the GUI 40 which requests a password be entered by the user in order to gain access to the obscured control information (Steps 112,114). Techniques necessary to create such a control or window 56 are well known in the art. If it is determined in Step 116 that the correct password has been entered by the user, the security control subclass causes the slide panel to be removed from the screen, thereby making the information in the control visible to the user (Step 118).

Alternatively, the controls may be obscured so that there appears to be no secured or obscured information in the window. Selection of a security icon or the like could then trigger the above-described password access routine.

Whether or not the user inputs the correct password can be determined in a number of known ways. For example, the password can be the user's logon password, or each secure control can have a specific password, or one password can provide access to all controls, to a particular set of controls, or to a particular level of access to the control(s), such as view only. In any case, communication is conducted between a repository of such information for verification of the input password in accordance with known techniques. The repository may be resident in the memory associated with a mainframe computer or that associated with a LAN, or may be part of the application in use itself.

After the obscuration is removed in Step 118, the counter is reset to zero (Step 120), and an optional timer subroutine (Step 122) may be entered. This timer subroutine is more fully explained below with respect to Steps 154–162 of the flowchart of FIGS. 7A and 7B. Additionally, a hot key or other input technique may be employed by which selection of the hot key in Step 124 will cause the process to return to Step 106 for re-obscuring of the control information.

If it is determined in Step 116 that the incorrect password has been entered by the user (or if a period of time passes without the entry of a password, etc.), the counter value is incremented by one (Step 126). If the user has failed to enter the correct password after a predetermined number of attempts, for example, three, it is desired in the preferred embodiment to secure the system. Accordingly, if it is determined in Step 128 that the value of the counter equals three, the application is closed (Step 130). Alternatively, the window could be closed or the user session ended. If it is found that the value of the counter does not yet equal three in Step 128, the security control subclass would then cause the user to be informed that the correct password has not been entered and asked whether another chance is desired to enter the appropriate password or whether the user wants to opt out of the password control (Step 132). If it is determined in Step 134 that the user has selected the re-enter password option, the system returns to Step 114 and requests that the user input a password. If the user requests to opt out of the password entry subroutine in Step 134, the system returns to Step 110 and displays the window 42 with the secure controls obscured, as illustrated in FIG. 4.

Figure 7B:
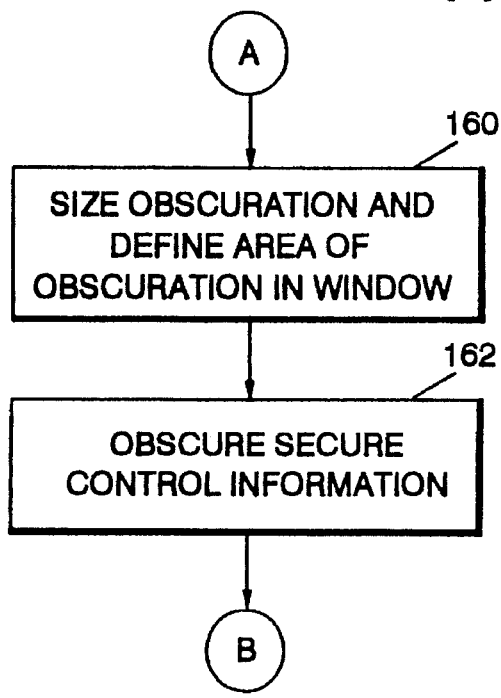
FIGS. 7A–7B illustrates a flow chart of the logic involved in opening a window having controls secured based on user identity in accordance with the present invention.
Figure 7A:
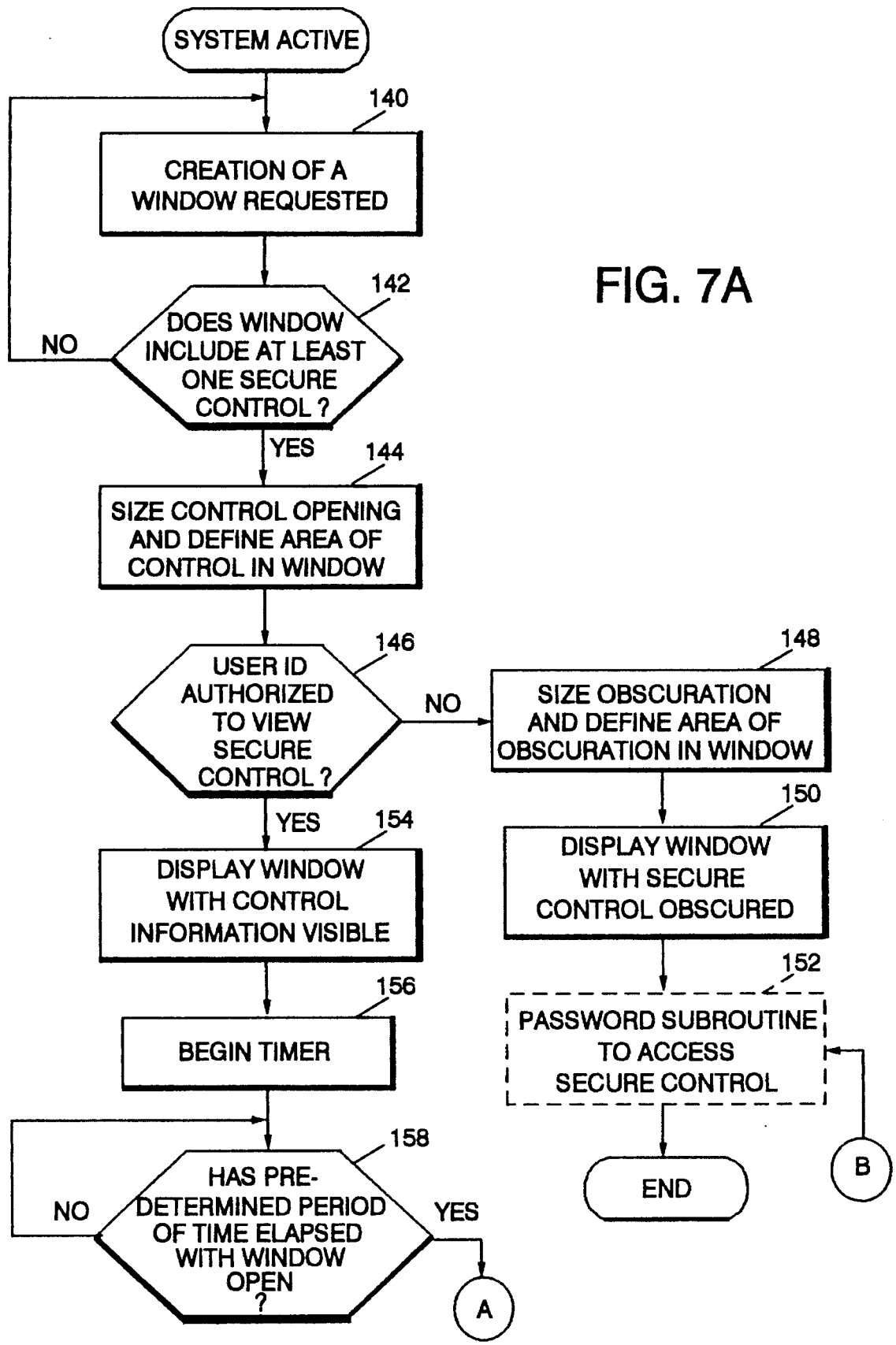

An alternative to this embodiment will now be described with respect to the flow chart of FIGS. 7A and 7B. Following a request for the creation of a window (Step 140), if it is determined that the window to be created by the computer system includes one or more secure controls (Step 142), the following logic is employed in accordance with the present invention. First, the size of each control opening is calculated and the area of each control opening within the window is defined (Step 144). The attributes of the security control subclass relative to each secure control then check to see whether the registered user making the request is authorized to view the secure control information (Step 146). This may be accomplished by checking the user identification of the user running this session against a list of authorized user identifications. Alternatively, access may be provided depending on the identity of the terminal or workstation. In this case, a check would be performed to determine whether the terminal on which the session is running is an authorized terminal. Such checks can be implemented in accordance with well known techniques.

If it is determined in Step 146 that the user is not authorized to view control information for a given secure control, the obscuration is sized and its area defined (Step 148), and the window is displayed so that the control information in the secure control is obscured by a slide panel or other form of obscuration (Step 150). Optionally, a password subroutine, such as that described with reference to Steps 112–134 of the flow chart of FIGS. 5A and 5B, may be employed to enable access to secure controls (Step 152). This option is valuable when an authorized user is not at his or her own authorized terminal, or at a terminal which was not logged on using an authorized user identification, and needs quick access to secure control information.

On the other hand, for any secure control which the system determines the user is authorized to view in Step 146, the window is displayed such that the secure control information is not obscured (Step 154).

Optionally, a timer can be employed to prevent information within secure controls from being continuously displayed in the window. In accordance with Step 156, upon displaying a window with information from secure controls visible, a clock is started. After it is determined that a predetermined amount of time has elapsed (Step 158), the security control subclass causes the information in the secure control(s) to be obscured by sizing the obscuration and defining the area of obscuration within the window (Step 160) and causing the obscuration to appear in the window over the appropriate control information (Step 162). The process may optionally return to Step 152, in which a password access subroutine may then be employed to permit the user to regain access to secure control information. Alternatively, visual access to the secure control information may not be permitted until the window is recreated by the user.

Other modifications of a security control subclass are possible. For instance, different levels of access to secure control information may be provided by the security control subclass. For example, one set of users could be allowed to both see and manipulate the data in a particular secure control, while a second set of users could be permitted only to see the data, while a third set of users would be permitted to neither see nor manipulate the data. To implement this modification, for example, the logic described with reference to FIGS. 7A and 7B could be modified so that Step 146 would determine what type of access the user would be permitted based on the user's identification, i.e., no access, view only, or view and manipulation of the control information. Alternatively, the levels of access could be view only and view and manipulate. Similarly, different passwords relative to a secure control could permit different levels of access. Accordingly, it will be appreciated by those skilled in the art that various modifications and variations are possible without departing from the spirit and the scope of the invention.

We claim:

1. A method for limiting access to information in predetermined controls of windows in a graphical user interface, comprising the steps of:

during creation of a window having a predetermined control, sizing an opening for the predetermined control and defining an area for the predetermined control within the window;

sizing an obscuring member and defining an area for the obscuring member within the window so that the information in the predetermined control will be obscured from view when the window is displayed; and displaying the window with the information in the predetermined control obscured from view by the obscuring member.

2. A method according to claim 1, further comprising the step of:

during creation of the window, sizing a secure control access button and defining an area for the button within the window, wherein said displaying step further comprises displaying the secure control access button.

3. A method according the claim 2, further comprising the steps of:

upon selection of the secure control access button by a user, sizing a password control and defining an area for the password control within the window;

displaying the password control;

upon entry of a password by the user, determining whether the password is authorized;

if the entered password is authorized, deleting the obscuration and providing a password dependent level of access to the information of the predetermined control; and if the password is not authorized, denying access to the information of the predetermined control.

4. A method according to claim 3, further comprising the step of:

terminating the user session if the user unsuccessfully attempts to enter a password more than a predetermined number of times.

5. A method according to claim 3, further comprising the step of:

re-obscuring the information of the predetermined control if the information has been visible for more than a predetermined amount of time.

6. A method according to claim 3, wherein in said deleting and providing step, the level of access to the information is view only if the password is a view-only level password and is view and manipulate only if the password is a view and manipulate level password.

7. A method according to claim 1, wherein the obscuring member is a slide panel which fits over the area of the predetermined control.

8. A method according to claim 1, wherein the obscuring member has characteristics such that the existence of the predetermined control is not determinable by viewing the window.

9. In a computing environment including a processor, memory and a display, a system for limiting access to selected controls of a window of a software application, comprising:

means for obscuring information of a selected control of a window normally presented to a user via the display upon creation of the window;

means for recognizing a request from the user to access the obscured information of the selected control; and means for determining whether the user is authorized to access the obscured information and permitting access if the user is authorized.

10. A system according to claim 9, wherein said determining means further comprises means for requesting entry of a password, means for receiving an entered password, and means for determining whether the entered password is valid for gaining access to the obscured information.

11. A system according to claim 9, wherein said determining means provides different levels of access to the obscured information depending on an authorization level of the user.

12. A system according to claim 9, further comprising means for closing the application upon the user unsuccessfully requesting access to the obscured information a predetermined number of attempts.

13. A system according to claim 9, further comprising means for re-obscuring the information in the selected control after the information has been accessible for a predetermined amount of time.

14. A method for restricting access to information in predetermined controls of windows in a graphical user interface, comprising the steps of:

during creation of a window having a predetermined control, determining whether a user requesting creation of the window is authorized to access the control;

if the requesting user is authorized, sizing and defining the predetermined control within the window and displaying the predetermined control within the window so that the information in the predetermined control is accessible;

if the requesting user is not authorized, sizing and defining the predetermined control within the window, sizing and defining a region of obscuration coincidental with at least the information in the predetermined control, and displaying the predetermined control within the window so that the information is obscured from view by the region of obscuration.

15. A method according to claim 14, further comprising the step of, after the elapse of a predetermined period of time following the displaying of the predetermined control with the information accessible, sizing and defining a region of obscuration coincidental with at least the information in the predetermined control and displaying the region of obscuration over the information.

16. A method according to claim 14, wherein said determining step further comprises checking a user identification of the user with an authorization repository to determine an authorization level of the user.

17. A method according to claim 14, wherein said determining step further comprises determining a level of access permitted for a workstation for which the window is being created by checking on identification for the workstation with an authorization repository.

18. A method according to claim 14, further comprising, if the requesting user is not authorized, the steps of:

sizing and defining in the window and displaying a control access request button;

upon selection of the control access button by the user, sizing a password control and defining an area for the password control within the window;

displaying the password control;

upon entry of a password by the user, determining whether the password is authorized;

if the entered password is authorized, deleting the obscuration and providing a password dependent level of access to the information of the predetermined control; and if the password is not authorized, denying access to the information of the predetermined control.

19. A method according to claim 18, further comprising the step of:

terminating the user session if the user unsuccessfully attempts password entry more than a predetermined number of times.

20. In a computing environment including a processor, memory and a display, a system for selectively permitting access by users to limited access controls included in windows of a software program, comprising:

means for determining whether a user is authorized to access a limited access control of a window during creation of the window;

means for denying access to the limited access control if said determining means determines that the user is not authorized; and means for providing an authorized level of access to the limited access control if said determining means determines that the user is authorized.

21. A system according to claim 20, wherein the authorized levels of access include view only access to information in the limited access control and view and manipulate access to information in the limited access control.

22. A system according to claim 20, when said access denying means comprises an obscuring member positioned coincidentally within the window to at least information included in the limited access control.

23. A system according to claim 22, wherein the obscuring member is a slide panel which covers the limited access control.

24. A system according to claim 23, wherein the obscuring member covers the limited access control so that whether the limited access control exists cannot be determined by viewing the window.

25. A system according to claim 20, further comprising means for recognizing a request from the user to access the limited access control to which said denying means initially denied access.

26. A system according to claim 20, further comprises means for terminating access to the limited access control after access to the limited access control has been provided for a limited access period of time.

27. A system according to claim 20, wherein said determining means establishes an identity of a workstation being used by the user and compares the identity with an access authorization list to determine whether the user is authorized to access the limited access control.

28. A class included on media for providing limited user interaction to controls defined in a graphical user interface to which said object class is applied, comprising:

means for defining and sizing a limited access region within the graphical user interface coincidental to at least information included in a control to which said object class has been applied during creation of the control for display purposes;

means for limiting user interaction to the information in the control within the limited access region; and means for processing requests to interact with the information in the limited access region.

29. A class according to claim 28, wherein said processing means further comprises means for sizing and defining a password access request control within the graphical user interface and causing the password access request control to be displayed, means for determining a level of access to the information to which an input password corresponds, and means for providing the user with the determined level of access to the information.

30. A class according to claim 29, wherein the levels of access include no access, view only, and view and manipulate.

31. A class according to claim 28, wherein the limited access region is a region of obscuration which shields the information from view and prevents user manipulation of the information.

32. A class stored on media for providing limited user interaction to controls defined in a graphical user interface to which said object class is applied, comprising:

means for discovering a level of access to a control to which said object class has been applied to which a user is authorized upon a user requesting creation of a window including the control; and means for limiting user interaction to the information in the control in accordance with the level of access.

33. A class according to claim 32, further comprising:

means for processing requests to interact with the information in the control.

* * * * *